(12) United States Patent
Thueringer et al.

(10) Patent No.: US 9,911,075 B1
(45) Date of Patent: Mar. 6, 2018

(54) RFID TRANSPONDER AND METHOD FOR SUPPLYING ENERGY THERETO

(71) Applicant: NXP B.V., Eindhoven (NL)

(72) Inventors: Peter Thueringer, Graz (AU); Franz Amtmann, Gratkorn (AU)

(73) Assignee: NXP B.V., San Jose, CA (US)

( * ) Notice: Subject to any disclaimer, the term of this patent is extended or adjusted under 35 U.S.C. 154(b) by 0 days.

(21) Appl. No.: 15/255,020

(22) Filed: Sep. 1, 2016

(51) Int. Cl.
*G06K 19/077* (2006.01)
*G06K 19/07* (2006.01)

(52) U.S. Cl.
CPC ..... *G06K 19/071* (2013.01); *G06K 19/07773* (2013.01)

(58) Field of Classification Search
USPC .............. 235/492; 363/170; 340/10.34
See application file for complete search history.

(56) References Cited

U.S. PATENT DOCUMENTS

| | | |
|---|---|---|
| 8,120,487 B2 | 2/2012 | Chang et al. |
| 8,797,163 B2 | 8/2014 | Finkenzeller |
| 8,838,023 B2 | 9/2014 | Charrat et al. |
| 8,934,836 B2 | 1/2015 | Lefley et al. |
| 9,281,874 B2 | 3/2016 | Lefley et al. |
| 9,331,378 B2 | 5/2016 | Merling et al. |
| 9,401,739 B2 | 7/2016 | Pieber et al. |
| 2007/0153561 A1* | 7/2007 | Mickle ............... G06K 19/0707 363/170 |
| 2008/0150360 A1* | 6/2008 | Vezza ................... G01D 21/00 307/31 |
| 2009/0179761 A1* | 7/2009 | Chang ....................... G06F 1/32 340/572.1 |
| 2010/0231407 A1* | 9/2010 | Carr .................... G06K 19/0723 340/691.1 |
| 2011/0068901 A1* | 3/2011 | Liu ..................... G06K 19/0723 340/10.1 |
| 2014/0045442 A1* | 2/2014 | Caruana ............... H01Q 1/2275 455/78 |
| 2015/0069139 A1 | 3/2015 | Narendra et al. |
| 2015/0145602 A1 | 5/2015 | Felgentreff et al. |
| 2016/0047880 A1* | 2/2016 | Helfrick ................ G01S 5/0231 340/981 |
| 2016/0155040 A1* | 6/2016 | Patterson ........... G06K 19/0708 235/492 |

OTHER PUBLICATIONS

Michael Gebhart, Markus Wobak, Erich Merlin and Christoph Chlestil, "Active Load Modulation for Contactless Near-Field Communication", 3rd RFID-TA, pp. 228-233, Nov. 2012.

K. K. A. Devi, Md. Din Norashidah, C. K. Chakrabarty, and S. Sadasiva, "Design of an RF-DC Conversion Circuit for Energy Harvesting", IEEE International Conference on Electronic Design, Systems and Applications, 2012.

\* cited by examiner

*Primary Examiner* — Allyson Trail
(74) *Attorney, Agent, or Firm* — Charles E. Bergere

(57) ABSTRACT

A RFID transponder includes an active load modulation unit and an energy harvesting unit coupled to the active load modulation unit. The active load modulation unit performs active load modulation on transmitted signals. The energy harvesting unit harvests RF energy from the ambient environment, converts the RF energy to DC energy, stores the DC energy, and supplies the DC energy to the active load modulation unit.

12 Claims, 8 Drawing Sheets

RFID TRANSPONDER AND METHOD FOR SUPPLYING ENERGY THERETO

BACKGROUND

The present invention is directed to a RFID transponder and, more particularly, to a RFID transponder having an active load modulation unit and a method for supplying energy to the RFID transponder.

The ISO/IEC 14443 contactless smartcard infrastructure is optimized for relatively large antenna sizes (ISO-card ID1). However, more and more devices, like wearable devices, require smaller antenna geometries, which results in a much lower coupling coefficient to the reader antenna as compared when smartcard sized antennas are used. This lower coupling coefficient limits the power transmitted to small transponders, and more importantly, also limits the strength of return link signals from the transponders to a reader.

Conventionally, the return link signals of a passive transponder are generated by loading the magnetic field of the reader (load modulation, also called passive load modulation). This passive load modulation may be realized with a resistor/resistors or a capacitor/capacitors switched by the data signal loading the magnetic field. It also may be realized with a transistor acting as a resistor. However, if the signal received by the reader is below the reader's sensitivity, the transponder cannot be detected, read or written to by the reader.

To overcome this weak signal issue, "active load modulation" is used, such that instead of changing the chip input impedance by switching a resistor or a capacitor, the transponder actively transmits a signal back to the reader. This active transmission has to be frequency and phase synchronous to the reader carrier signal, only in this case the return signal looks like a load modulated signal to the reader, which is very important so that existing infrastructure can be used.

Since transponders using active load modulation consume more power than those using passive load modulation, the transponders need sufficient energy to perform the active load modulation. However, passive transponders using small antennas can't supply sufficient energy for active load modulation. Thus, a battery is used to store the energy needed to perform for active load modulation. However, embedding a battery in a transponder increases the size of the transponder, which defeats the ability to reduce the size of the transponder, especially for wearable, small form factor transponders. Further, for semi-passive transponders that have an assisted battery but do not use the battery to supply energy for active load modulation, using the battery to supply energy for active load modulation would require a bigger battery, thus increasing the size and cost of the transponders.

Accordingly, it is desired to have an energy supply solution for small form factor passive or semi-passive transponders.

SUMMARY

A RFID transponder and method for supplying energy to a RFID transponder are described herein.

A RFID transponder comprises an active load modulation unit and an energy harvesting unit coupled to the active load modulation unit. The active load modulation unit performs active load modulation for transmitting signals. The energy harvesting unit harvests RF energy from the ambient environment, converts the RF energy to DC energy, stores the DC energy, and supplies the DC energy to the active load modulation unit.

A method for supplying energy to the RFID transponder that includes an active load modulation unit comprises harvesting RF energy from the ambient environment, converting the RF energy to DC energy, storing the DC energy, and supplying the DC energy to the active load modulation unit.

The above features, and other features and advantages will be readily apparent from the following detailed description when taken in connection with the accompanying drawings.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

DETAILED DESCRIPTION

Figure 1:
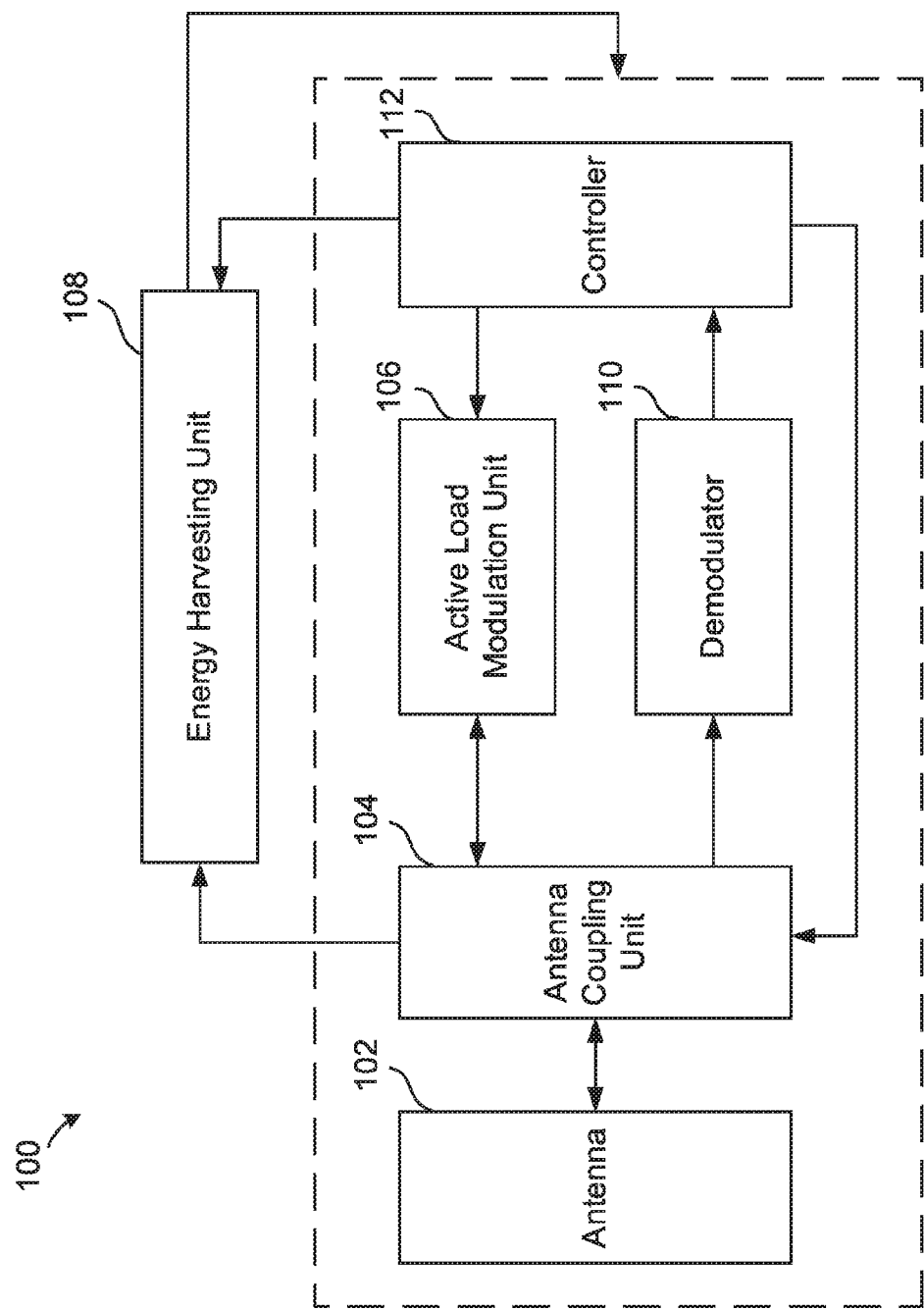
FIG. 1 is a schematic block diagram of a RFID transponder in accordance with an exemplary embodiment.

FIG. 1 is a schematic block diagram of a RFID transponder 100 in accordance with an exemplary embodiment of the present invention. The RFID transponder 100 includes an antenna 102, an antenna coupling unit 104, an active load modulation unit 106, an energy harvesting unit 108, a demodulator 110 and a controller 112.

The RFID transponder 100 uses the antenna 102 to receive magnetic field and signals from an external device (e.g., a reader) and transmit signals to the external device. Antennas that receive and transmit signals from/to readers are known in the art and thus further description is not necessary for a complete understanding of the present invention. Antennas for Near Field Communications that can transmit and receive signals are generally known, such as from U.S. Pat. No. 9,331,378 of Merlin et al., and assigned to NXP BV, the contents of which is herein incorporated by reference.

The antenna coupling unit 104 is connected to the antenna 102 and implements impendence and phase matching and tuning. The circuitry for performing impedance and phase matching will be described in more detail with relation to FIG. 6.

The active load modulation unit 106 is connected to the antenna coupling unit 104 and the controller 112. The active load modulation unit 106 performs active load modulation to actively transmit signals to an external device.

The energy harvesting unit 108 is connected to the antenna coupling unit 104 and harvests RF energy from the ambient environment. In one embodiment, the energy harvesting unit 108 harvests RF energy from magnetic fields, especially from H-field generated by the external device/reader and received by the antenna 102. The energy harvesting unit 108 converts the RF energy to DC energy, and stores the DC energy.

The energy harvesting unit 108 is also connected to the active load modulation unit 106 and supplies the DC energy to the active load modulation unit 106. The energy harvesting unit 108 also may be coupled to one or more other components of the RFID transponder 100 and supply the DC energy to such components as necessary.

The demodulator 110 demodulates a modulated RF input signal received from an external device and provides the demodulated signal to the controller 112 for further processing. Such demodulators are generally known in the art and further description of this circuitry is not necessary for one of skill in the art to understand the invention.

The controller 112 can be a microcontroller or a state machine. The controller 112 ensures that the transmit voltage in the case of active load modulation is not harvested and that the demodulator 110 does not lock to its own transmission signal during active load modulation. The controller 112 also controls the signaling (i.e., the demodulator 110), as well as other parts of an RFID system, as will be understood by those of skill in the art.

Figure 2:
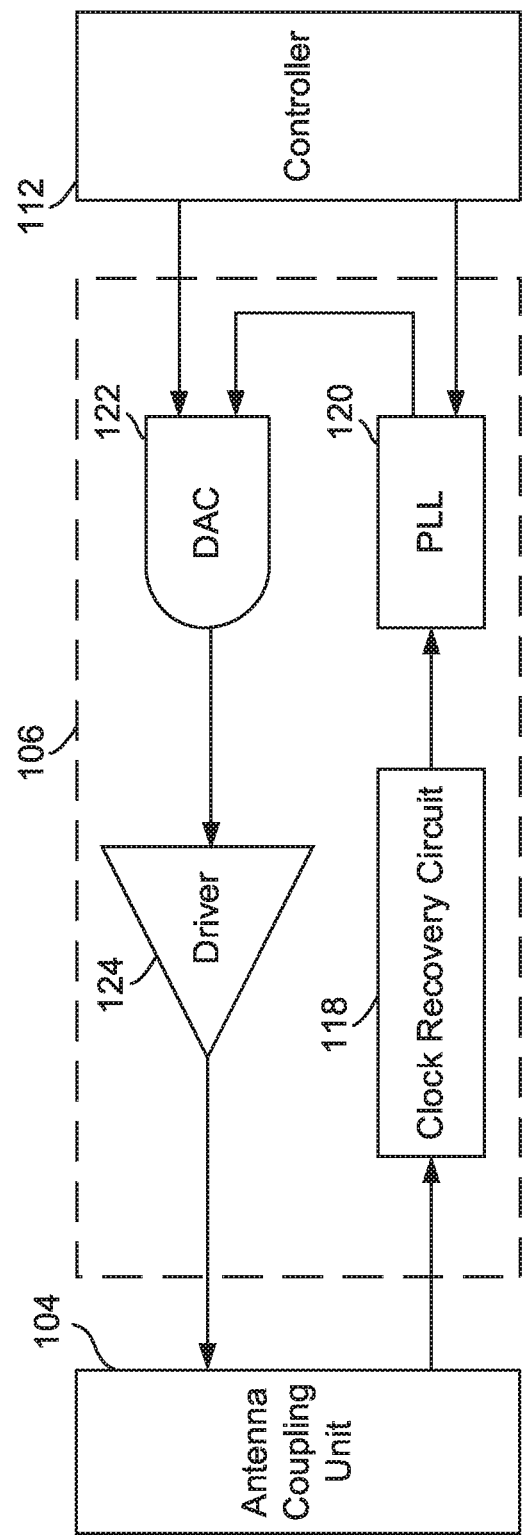
FIG. 2 is a schematic block diagram of active load modulation unit of the RFID transponder of FIG. 1 in accordance with an exemplary embodiment.

FIG. 2 is a schematic block diagram of the active load modulation unit 106 of FIG. 1 in accordance with an exemplary embodiment of the present invention. As previously discussed, the active load modulation unit 106 is connected between the antenna coupling unit 104 and the controller 112. The active load modulation unit 106 includes a clock recovery circuit 118, a Phase-Locked Loop (PLL) 120, a Digital to Analog Converter (DAC) 122 and a driver 124.

The clock recovery circuit 118 recovers a clock received at the antenna 102 from a magnetic field. The PLL 120 receives the recovered clock signal from the clock recovery circuit 118 and generates a PLL signal that is provided to the DAC 122. The PLL 120 also receives a control signal from the controller 112 when the RFID transponder 100 is operating in an active transmission phase. The control signal indicates a reference clock. The DAC 122 converts a digital transmission signal received from the controller to an analog signal using the PLL signal. The DAC 112 is connected to the driver 124, which receives the analog signal generated by the DAC 112 and provides the analog signal to the antenna coupling unit 104. The DAC 112 is an optional component of the active load modulation unit 106, and the driver 124 can be directly controlled by the controller 112. If the DAC 112 is not included, then the driver 124 provides a transmission signal generated by the PLL 120 in accordance with a transmission control signal generated by the controller 112 to the antenna coupling unit 104. The active load modulation unit 106 performs active load modulation to actively transmit signals back to the external device. The above-description is simplified so as not to obscure the present invention. Active load modulation circuitry is known, such as from U.S. Pat. No. 9,401,739 of Pieber et al. and assigned to NXP BV, the content of which is incorporated by reference.

Figure 3A:
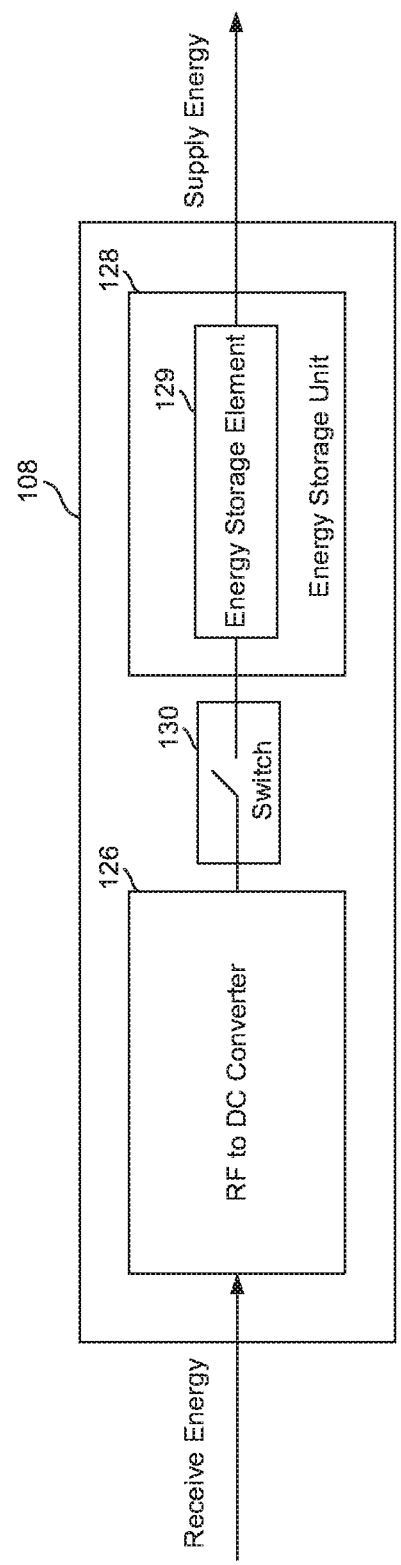
FIG. 3A is a schematic block diagram of an energy harvesting unit of the RFID transponder of FIG. 1 in accordance with an exemplary embodiment.

FIG. 3A is a schematic block diagram of the energy harvesting unit 108 of the RFID transponder of FIG. 1 in accordance with an exemplary embodiment of the present invention. The energy harvesting unit 108 includes a RF to DC converter 126 and an energy storage unit 128. The RF to DC converter 126 converts the received RF energy into DC energy and stores the DC energy in the energy storage unit 128. In one embodiment, the RF to DC converter 126 comprises a voltage multiplier including one or more capacitors and one or more diodes connected between the antenna coupling unit 104 and the energy storage unit 128. However, other circuit arrangements for RF to DC converters, such as a rectifier or a charge pump, are known by those of skill in the art and the present invention is not limited to any one specific implementation. The energy storage unit 128 supplies the stored DC energy to the active load modulation unit 106.

The energy harvesting unit 108 preferably also includes a switch 130. When the RFID transponder 100 performs active load modulation, the switch 130, as controlled by the controller 112, is open (off) so there is not a connection between the RF to DC converter 126 and the energy storage unit 128 to prevent energy from going back into the RF to DC converter 126.

The energy storage unit 128 may also supply the stored DC energy to one or more other components of the RFID transponder 100 as required. Further, the energy storage unit 128 supplies the DC energy to the active load modulation unit 106 and the one or more other components based on a preset energy supply rule.

The preset energy supply rule defines when and how the active load modulation unit 106 and the one or more other components are charged by the energy storage unit 128. For example, the active load modulation unit 106 and the one or more other units may be charged in parallel. In another embodiment, the preset energy supply rule defines a priority order for the energy storage unit 128 to supply the DC energy to the active load modulation unit 106 and the one or more other components.

In one embodiment, the preset energy supply rule defines that the energy storage unit 128 supplies the DC energy to the active load modulation unit 106 after the energy storage unit 128 supplies a certain amount of the DC energy to one or more other components. The one or more other components may be components that are essential for internal processing by the RFID transponder 100, and the above-mentioned certain amount of energy may be a minimum amount of the DC energy that these essential components need to operate.

In another embodiment, the preset energy supply rule defines that the energy storage unit 128 supplies the DC energy to the active load modulation unit 106 before the energy storage unit 128 supplies the DC energy to one or more other components, so that sufficient energy can be supplied to the active load modulation unit 106 for performing active mode modulation.

In FIG. 3A, the energy storage unit 128 includes one energy storage element 129, which is used for supplying the DC energy to the active load modulation unit 106 and the one or more other components of the RFID transponder 100. In other embodiments, the energy storage unit 128 may include a plurality of energy storage elements that supply the DC energy to the active load modulation unit 106 and the one or more other components separately. In one embodiment, the energy storage unit 128 comprises one or more capacitors having first terminals connected to a node between the RF to DC converter 126 and the active load modulation unit 106 and second terminals connected to ground. The capacitors are sized such that they fit within the RFID transponder 100 and store sufficient energy to operate the active load modulation unit 106. However, in one embodiment, the energy storage unit comprises off-chip capacitors on the order of a few microfarads.

Figure 3B:
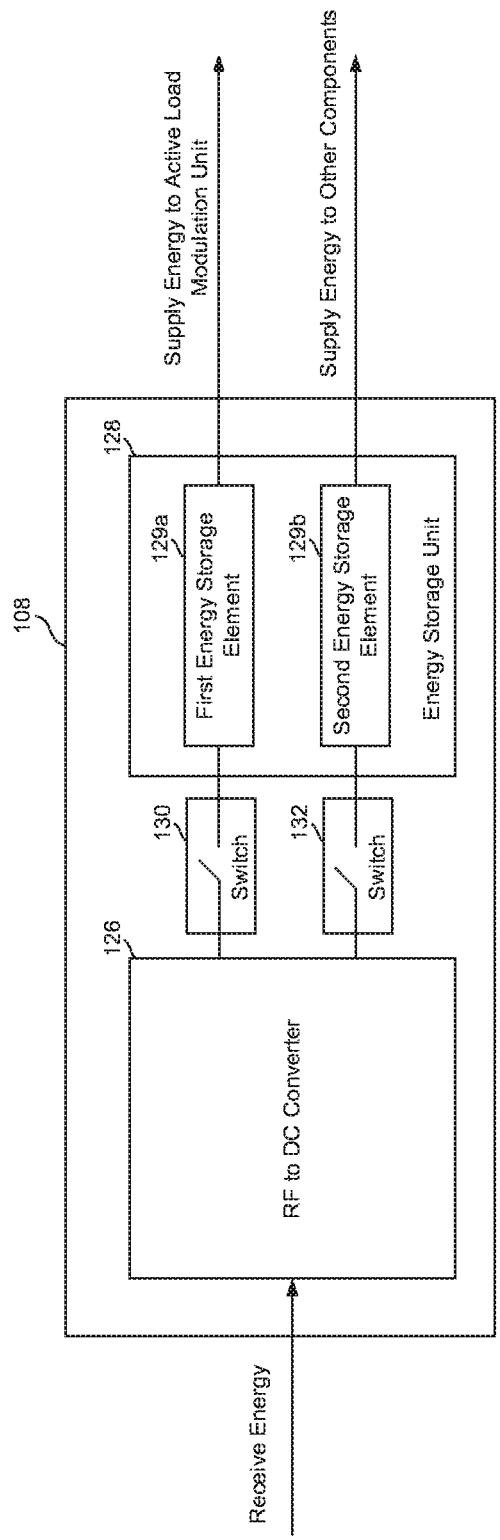
FIG. 3B is a schematic block diagram of an energy harvesting unit of the RFID transponder of FIG. 1 in accordance with another exemplary embodiment.

As shown in FIG. 3B, in one embodiment, the energy storage unit 128 includes first and second energy storage elements 129a and 129b. The first energy storage element 129a is used for supplying DC energy to the active load modulation unit 106, and the second energy storage element 129b is used for supplying DC energy to one or more other components.

The RF to DC converter 126 stores DC energy in the energy storage elements 129a and 129b based on a preset energy storage rule. The preset energy storage rule may define that the RF to DC converter 126 stores the DC energy in the energy storage elements 129a, 129b in parallel, or the preset energy store rule may define a priority order for the RF to DC converter 126 to store the DC energy in the energy storage elements 129a, 129b.

Also as shown in FIG. 3B, the energy harvesting unit 108 further includes a first switch 130 and a second switch 132. The first switch 130 is coupled between the RF to DC converter 126 and the first energy storage element 129a, and the second switch 132 is coupled between the RF to DC converter 126 and the second energy storage element 129b. The first and second switches 130 and 132 control connection and disconnection between the RF to DC converter 26 and the first energy storage element 129a and the second energy storage element 129b respectively.

In the embodiment shown, the first energy storage element 129a is dedicated to supplying energy to the active load modulation unit 106, which ensures sufficient energy is stored for the active load modulation unit 106, while the second energy storage element 129b is dedicated to supplying energy to one or more other components, which can reduce the risk that other components of the RFID transponder 100 do not have sufficient energy to function correctly.

Figure 4:
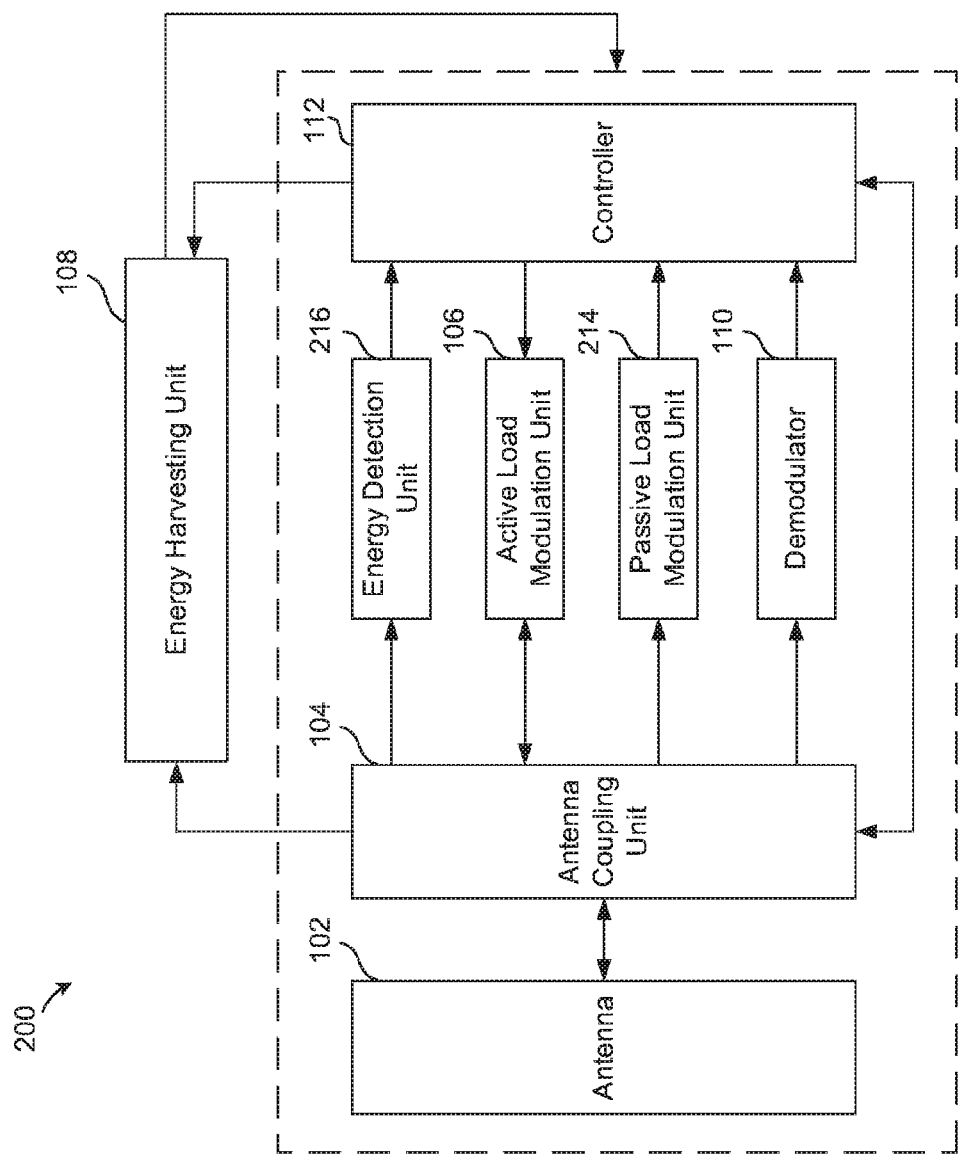
FIG. 4 is a schematic block diagram of a RFID transponder in accordance with another exemplary embodiment.
Figure 5:
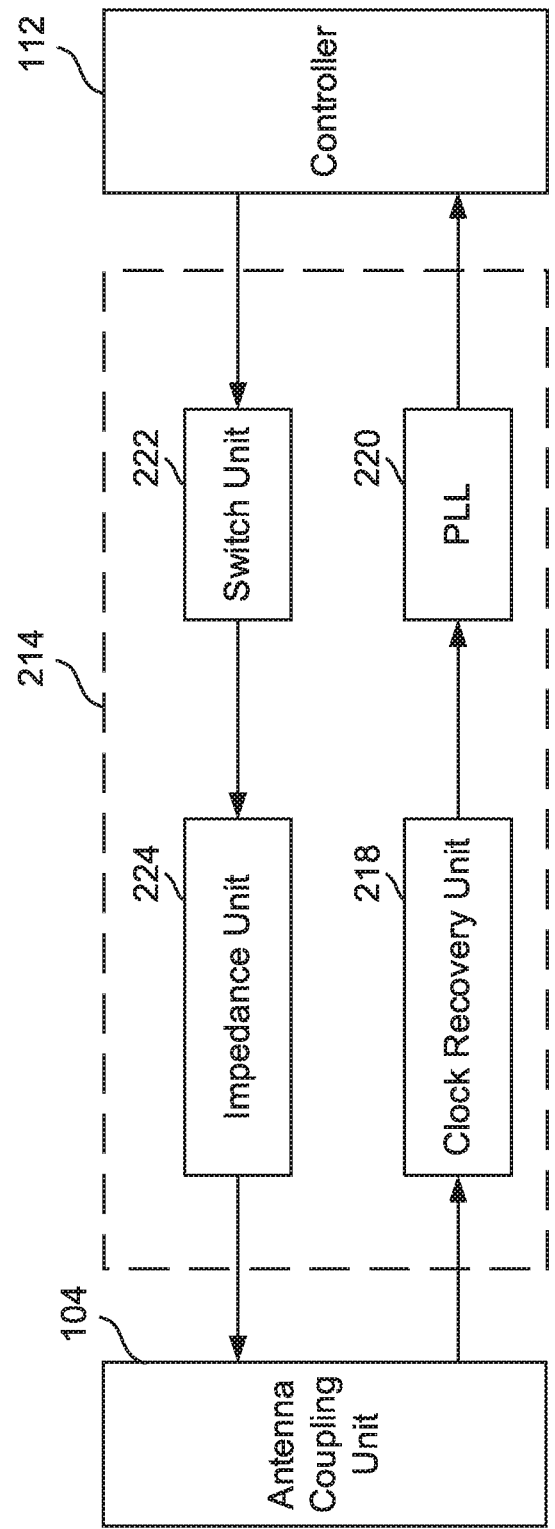
FIG. 5 is a schematic block diagram of a passive load modulation unit of the RFID transponder of FIG. 4 in accordance with an exemplary embodiment.

FIG. 4 is a schematic block diagram of a RFID transponder 200 in accordance with another exemplary embodiment of the present invention. The difference between the RFID transponder 100 and the RFID transponder 200 is that the RFID transponder 200 includes both an active load modulation unit 106 and a passive load modulation unit 214. The passive load modulation unit 214 performs a passive load modulation of the external device reader's field.

The RFID transponder 200 also may include an energy detection unit 216 that detects if the RF energy exceeds a predetermined threshold. If the energy detection unit 216 determines that the RF energy exceeds the predetermined threshold, the RFID transponder 200 uses the passive load modulation unit 214 to perform passive load modulation; and if the energy detection unit determines that the RF energy is equal to or less than the predetermined threshold, the RFID transponder 200 uses the active modulation unit 106 to perform active load modulation.

In one embodiment, the RFID transponder 200 may perform passive or active load modulation based on a size of the antenna 102. For example, if the antenna 102 is larger than a predetermined size, the passive load modulation unit 214 is used to perform passive load modulation, and if the antenna 102 is equal to or less than a predetermined size, the active load modulation unit 106 is used to perform the active load modulation. The determination result of performing the passive load modulation or the active load modulation may be stored in a memory, look-up table, or control register of the RFID transponder 200.

When the RFID transponder 200 performs passive load modulation, the energy storage unit 128 supplies DC energy to the passive load modulation unit 124 during energy gaps (modulation times in both directions) and to smooth current spikes.

Figure 6A:
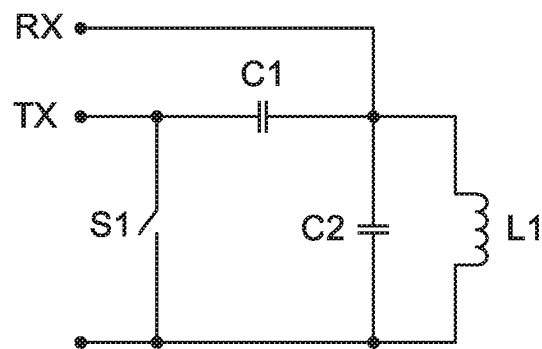
FIG. 6A is a schematic circuit diagram of an antenna coupling unit and an antenna of the RFID transponders of FIGS. 1 and 4 in according with an exemplary embodiment.
Figure 6B:
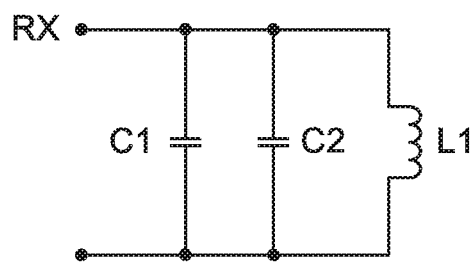
FIG. 6B is an equivalent circuit diagram of the antenna coupling unit and the antenna shown in FIG. 6A during a reception phase.
Figure 6C:
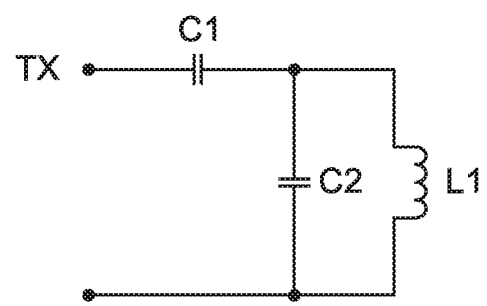
FIG. 6C is an equivalent circuit diagram of the antenna coupling unit and the antenna shown in FIG. 6A during an active transmission phase.

FIG. 6A is a schematic circuit diagram of the antenna coupling unit 104 and the antenna 102 shown in FIGS. 1 and 4 in accordance with an exemplary embodiment of the present invention, while FIG. 6B is an equivalent circuit diagram of the antenna coupling unit 104 and the antenna 102 during a reception phase, and FIG. 6C is an equivalent circuit diagram of the antenna coupling unit 104 and the antenna 102 during an active transmission phase. When the RFID transponder 100 or 200 operates in a reception phase, the antenna coupling unit 104 works with the antenna 102 in a parallel resonance mode. When the RFID transponder 100 or 200 operates in an active transmission phase, the antenna coupling unit 104 works with the antenna 102 in a serial resonance mode. In practice, the antenna coupling unit 104 may work with the antenna 102 in a substantive parallel resonance mode or a substantive serial resonance mode that is near to the parallel resonance mode and serial resonance mode respectively due to mistuning/intended mistuning, parasitics or other reasons.

In FIG. 6A, the antenna coupling unit 104 includes a transmission terminal TX, a reception terminal RX, a switch S1, a first capacitor C1, and a second capacitor C2, and the antenna 102 includes a inductor L1.

As shown in FIG. 6B, when the RFID transponder 100 operates in a reception phase, the switch S1 is closed so the first capacitor C1, the second capacitor C2 and the inductor L1 are connected in parallel.

As shown in FIG. 6C, when the RFID transponder operates in an active transmission phase, the switch S1 is open so the second capacitor C2 and the inductor L1 are connected in parallel and the first capacitor C1 is connected in series with both of the second capacitor C2 and the inductor L1.

When the RFID transponder operates in a passive load modulation phase, the antenna coupling unit 104 works in a parallel resonance mode as shown in FIG. 6B.

Another switch (not shown) may be coupled directly to the reception terminal and used to protect the reception terminal from high voltages on the antenna during transmission, and an EMC filter (Electromagnetic Compatibility Filter, also not shown) may be coupled to the transmission terminal and used to filter the higher harmonics.

The RFID transponder 100 or 200 may be a passive RFID transponder or a semi-passive RFID transponder.

The active load modulation unit 106 may regulate a transmission power based on the DC energy obtained from the energy harvesting unit 108. For example, if the energy harvesting unit 108 does not supply enough energy for the active load modulation unit 106 to operate with full power, the active load modulation unit 106 regulates a transmission power to a lower transmission power based on the DC energy obtained from the energy harvesting unit 108. This can be realized by reducing an output voltage of the DAC 122 or reducing a supply voltage of the driver 124.

Figure 7:
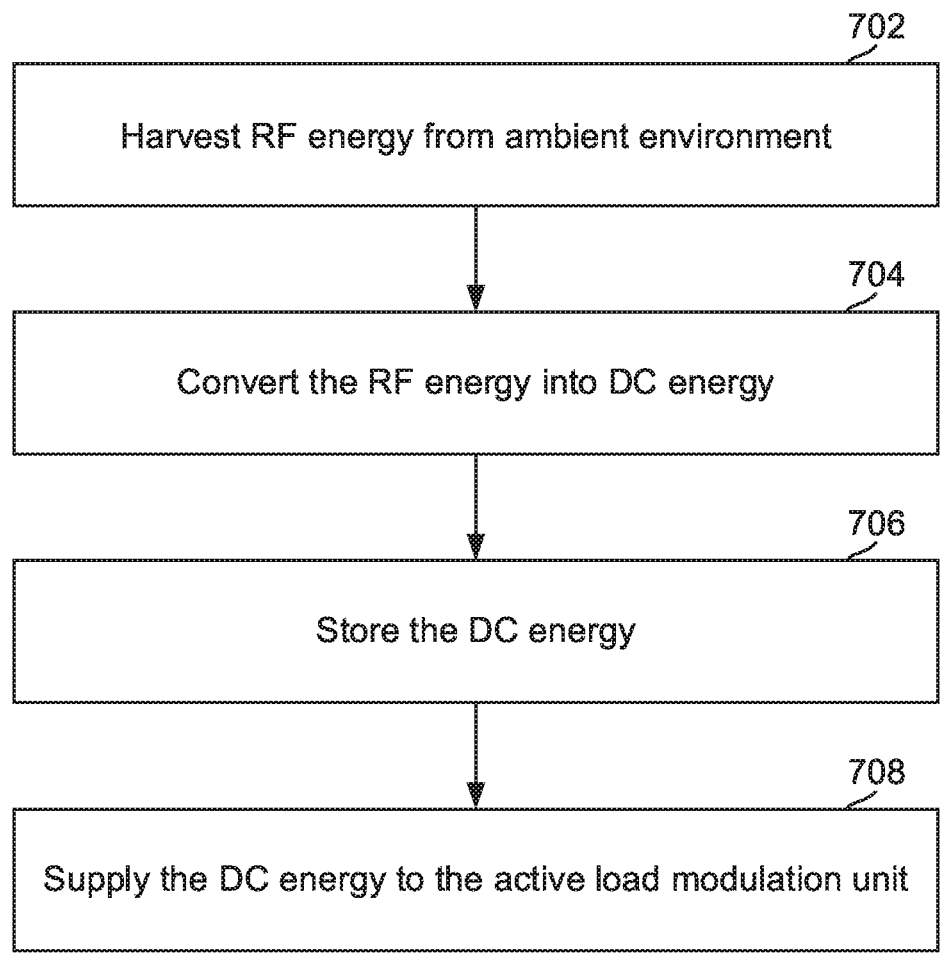
FIG. 7 is a flow chart of a method for supplying energy to a RFID transponder in accordance with an exemplary embodiment.

FIG. 7 is a flow chart of a method for supplying energy to the RFID transponder 100/200 in accordance with an exemplary embodiment of the present invention. The method includes harvesting RF energy from the ambient environment in step 702; converting the RF energy to DC energy in step 704; storing the DC energy in step 706; and supplying the DC energy to the active load modulation unit 106 and other components of the RFID transponder 100/200 as required in step 708.

The method further includes supplying the DC energy to one or more other components of the RFID transponder. Further, the DC energy is supplied to the active load modulation unit 106 and the one or more other components based on the above preset energy supply rule.

As for the RFID transponder 200 having both a passive load modulation unit 214 and an active load modulation unit 106, the method may include the following steps: detecting if the RF energy exceeds a predetermined threshold; performing passive load modulation if the RF energy exceeds the predetermined threshold, and performing active load modulation if the RF energy is equal to or less than the predetermined threshold.

In an alternative embodiment, for the RFID transponder 200 having both a passive load modulation unit and an active load modulation unit, the method may include the following steps: performing passive load modulation if the antenna is larger than a predetermined size; and performing active load modulation if the antenna is equal to or less than a predetermined size.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, the words 'comprising' and 'having' do not exclude the presence of other elements or steps then those listed in a claim. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A RFID transponder, comprising:
   an active load modulation unit that performs an active load modulation on transmitted signals, wherein said active load modulation unit includes a clock recovery circuit that recovers a clock received at an antenna from a magnetic field generated by a reader;
   an energy harvesting unit coupled to the active load modulation unit that harvests RF energy from an ambient environment, converts the RF energy into DC energy, stores the DC energy, and supplies the DC energy to the active load modulation unit; and
   a passive load modulation unit that performs passive load modulation of the field generated by the reader,
   wherein the energy harvesting unit comprises a RF to DC converter and an energy storage unit, wherein:
      the RF to DC converter converts the RF energy into the DC energy and stores the DC energy in the energy storage unit;
      the energy storage unit supplies the DC energy to the active load modulation unit and to one or more other components of the RFID transponder based on a preset energy supply rule.

2. The RFID transponder of claim 1, wherein, according to the preset energy supply rule, (i) the active load modulation unit and the one or more other components are charged in parallel, or (ii) a priority order is used for the energy storage unit to supply the DC energy to the active load modulation unit and the one or more other components.

3. The RFID transponder of claim 1, wherein the energy storage unit comprises a plurality of energy storage elements that supply the DC energy to the active load modulation unit and the one or more other components separately.

4. The RFID transponder of claim 3, wherein the RF to DC converter stores the DC energy in the plurality of energy storage elements based on a preset energy storage rule.

5. The RFID transponder of claim 4, wherein the preset energy storage rule defines (i) that the RF to DC converter stores the DC energy in the plurality of energy storage elements in parallel, or (ii) a priority order for the RF to DC converter to store the DC energy in the plurality of energy storage elements.

6. The RFID transponder of claim 1, further comprising an energy detection unit that detects if the RF energy exceeds a predetermined threshold, and (i) if the RF energy exceeds the predetermined threshold, then the passive load modulation unit performs the passive load modulation, and (ii) if the RF energy is equal to or less than the predetermined threshold, then the active modulation unit performs the active load modulation.

7. The RFID transponder of claim 1, further comprising:
   an antenna coupled to active load modulation unit for transmitting the signals,
   wherein if a size of the antenna is larger than a predetermined size, then the passive load modulation unit performs the passive load modulation, and if the size of the antenna is equal to or less than the predetermined size, then the active load modulation unit performs the active load modulation.

8. The RFID transponder of claim 7, further comprising an antenna coupling unit coupled between the antenna and the active load modulation unit, wherein the antenna coupling unit performs impendence and phase matching, and tuning, and wherein:
   when the RFID transponder operates in a reception phase, the antenna coupling unit works with the antenna in a parallel resonance mode; and
   when the RFID transponder operates in an active transmission phase, the antenna coupling unit works with the antenna in a serial resonance mode.

9. The RFID transponder of claim 8, wherein the antenna coupling unit includes a transmission terminal, a reception terminal, a switch, and first and second capacitors, and wherein:
   when the RFID transponder is in the reception phase, the switch is closed such that the first capacitor, the second capacitor, and the antenna are connected in parallel, and when the RFID transponder is in the active transmission phase, the switch is open such that the second capacitor and the antenna are connected in parallel, and the first capacitor is connected in series with the second capacitor and the antenna.

10. The RFID transponder of claim 1, wherein the energy harvesting unit harvests the RF energy from an H-field received from a reader.

11. A method for supplying energy to a RFID transponder having an active load modulation unit that performs active load modulation on transmitted signals, a passive load modulation unit that performs passive load modulation of a field generated by a reader, and an antenna coupled to the active and passive load modulation units, the method comprising the steps of:

harvesting RF energy from an ambient environment;

converting the RF energy to DC energy;

storing the DC energy;

supplying the DC energy to the active load modulation unit and one or more additional components of the RFID transponder based on a preset energy supply rule, wherein the preset energy supply rule defines that (i) the active load modulation unit and the one or more additional components are charged in parallel, or (ii) a priority order is used to supply the DC energy to the active load modulation unit and the one or more additional components; and performing the passive load modulation if a size of the antenna is larger than a predetermined size; and performing the active load modulation if the size of the antenna is equal to or less than the predetermined size.

12. The method of claim 11, further comprising:

detecting if the RF energy exceeds a predetermined threshold;

performing the passive load modulation if the RF energy exceeds the predetermined threshold; and performing the active load modulation if the RF energy is equal to or less than the predetermined threshold.

* * * * *